Nov. 24, 1970 — V. F. HALLIBURTON — 3,541,826
ROLL GROOVING AND SWAGING DEVICE
Original Filed Nov. 29, 1965 — 2 Sheets-Sheet 2

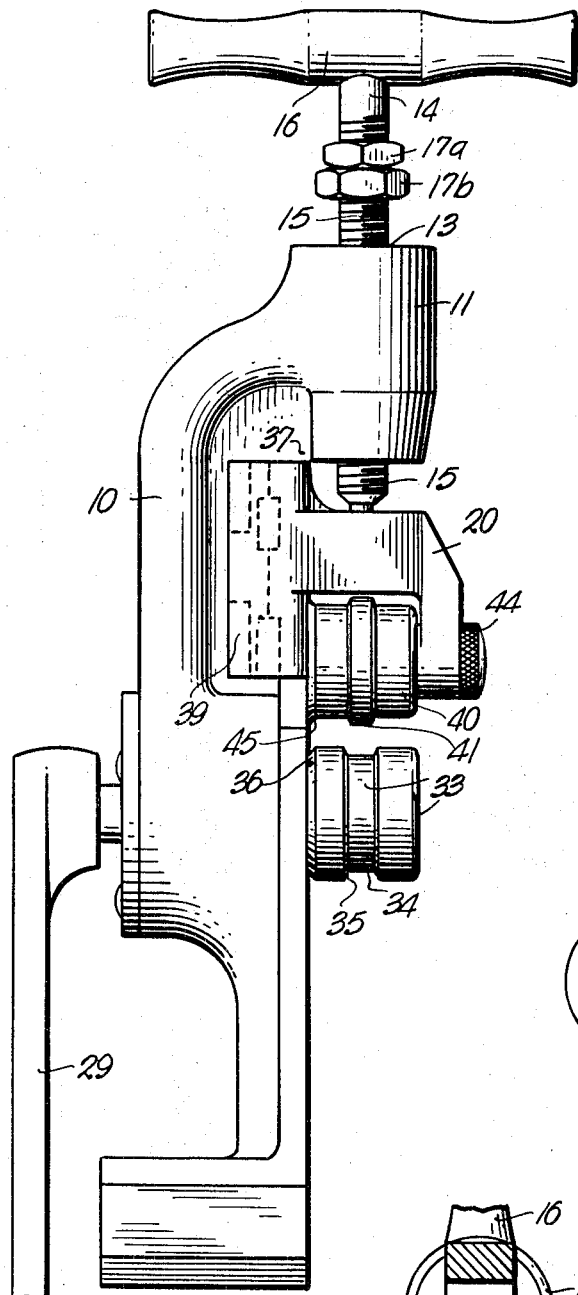
Fig. 1.
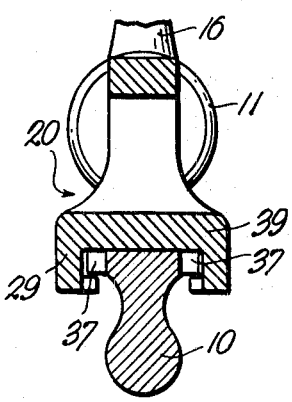
Fig. 3.
Fig. 2.
INVENTOR.
Virgil F. Halliburton

INVENTOR.
Virgil F. Halliburton
BY
Scofield, Kokjer, Scofield & Lowe
ATTORNEYS.

United States Patent Office 3,541,826
Patented Nov. 24, 1970

3,541,826
ROLL GROOVING AND SWAGING DEVICE
Virgil F. Halliburton, Kansas City, Mo., assignor, by mesne assignments, to Certain-Teed Products Corporation, Ardmore, Pa., a corporation of Maryland
Original application Nov. 29, 1965, Ser. No. 510,206. Divided and this application Feb. 19, 1968, Ser. No. 711,823
Int. Cl. B21d 17/04, 19/06
U.S. Cl. 72—105     5 Claims

ABSTRACT OF THE DISCLOSURE

A device for preparing the ends of lengths of pipe for coupling together which simultaneously rolls a groove into the pipe wall adjacent the free end thereof and swages the end, per se, circumferentially inwardly.

This application is a divisional application of my Ser. No. 510,206, filed Nov. 29, 1965 titled "Roll Grooving and Swaging Device and Products Thereof," now abandoned.

BACKGROUND OF THE INVENTION

This invention relates to a novel device for specially preparing pipe ends which are to be connected by a novel pipe coupling. It is further particularly directed to an entire coupled pipe joint, including specially prepared pipe ends, a tongue gasket and coupling housings joining the pipe end.

An object of the invention is to provide a device for forming grooves in the ends of relatively light walled pipe while simultaneously swaging the pipe ends inwardly.

Another object of the invention is to provide an apparatus for forming grooves in the ends of light walled pipe wherein the groove is formed by the cooperation of a female grooving roller positioned within the pipe and a male grooving roller positioned without the pipe, the same two rollers cooperating to simultaneously swage the end of the pipe inwardly as it is being grooved.

Another object of the invention is to provide an improved grooving tool having a novel roller construction wherein the ends of light walled pipe are swaged inwardly by the cooperation of an outer roller having a flared end and an inner roller having a mating beveled end, said rollers simultaneously forming grooves in the pipe by the cooperation of the female portion in the inner roller and the male portion in the outer roller.

Another object of the invention is to provide a pipe grooving and end swaging device for relatively thin walled pipes which is able to handle a large range of pipe diameters in a single tool with a minimum amount of adjustment of the tool.

A further object of the invention is to provide a tool or device for simultaneously rolling grooves into and inwardly swaging the end of thin walled pipe wherein the tool may be either manually operated or power operated without modification of the structure of the device and with a minimum amount of added apparatus.

Another object of the invention is to provide such a device which is simple in construction, extremely rugged, has a long life in service, consists of a relatively small number of parts and wherein all the parts thereof are readily accessible for replacement or repair if desired.

Another object of the invention is to provide a pipe coupling construction adaptable to couple pipe ends having been prepared by a device of the character described, said coupling being easily mountable on the pipe, inexpensive and corrosion preventing when secured to the specially grooved and swaged pipe ends.

Another object of the invention is to provide an improved pressure tight joint including a pipe coupling equipped with a pressure responsive tongue gasket. The gasket is operatively associated with specially swaged and grooved pipe ends to simultaneously connect and seal said ends and resist forces tending to pull the pipe ends apart. The tongue of said gasket is so oriented relative to the swaged ends that the usual radial forces exerted thereagainst operate to press the gasket tongue against the swaged end surfaces whereby to facilitate corrosion protection at both pipe ends as well as contribute to sealing of the entire coupling, including the usual vacuum cavity therein from pipe line fluid loss.

Other and further objects of the invention will appear in the course of the following description thereof.

DETAILED DESCRIPTION OF THE INVENTION

In the drawings, which form a part of the instant invention and are to be read in conjunction therewith, an embodiment of the invention is shown and, in the various views, like umerals are employed to indicate like parts.

FIG. 1 is a side-elevational view of a pipe grooving device embodying the invention with the swaging and grooving rollers thereof shown in a spaced apart position, same ready to receive a pipe end wall portion therebetween;

FIG. 2 is a front view of the pipe grooving device shown in FIG. 1 (a view from right to left in FIG. 1);

FIG. 3 is a view taken along line 3—3 of FIG. 2 in the direction of the arrows;

Figure 4:
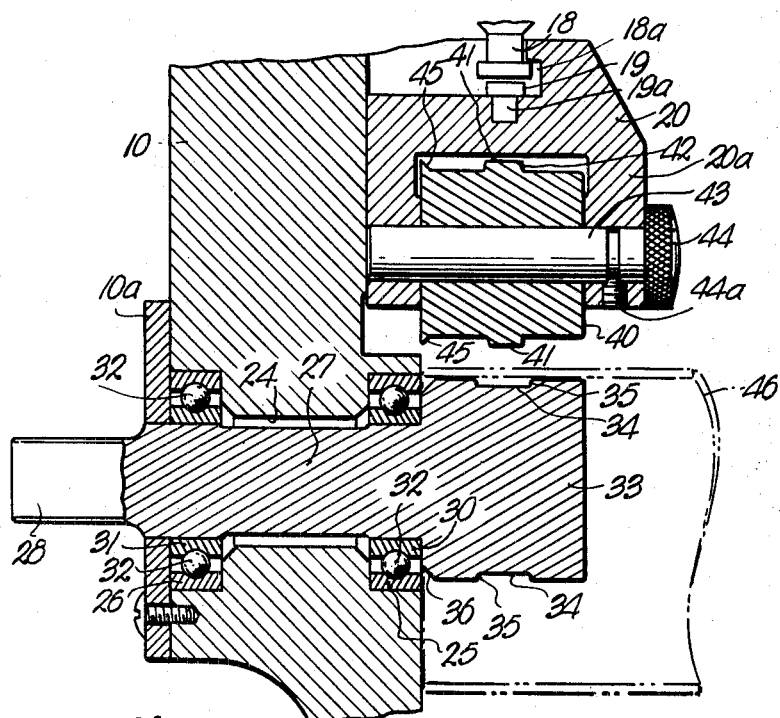
FIG. 4 is an enlarged fragmentary sectional view of the swaging and grooving rollers of the device of FIG. 1 with a pipe to be grooved shown in dotted lines positioned therebetween, the rollers shown before closing on the pipe.
Figure 6:
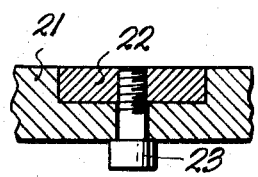
FIG. 6 is a view taken along the line 6—6 of FIG. 2 in the direction of the arrows.

Referring to the drawings, the operating parts of the pipe grooving device are mounted on a frame which has a central portion 10, upward forwardly extending portion 11 and lower rearwardly extending portion 12. Upper frame portion 11 has a threaded opening 13 extending vertically therethrough. Lower rearwardly extending frame portion 12 is shaped to form a hexagonal gripping boss to allow the device to be held in a bench vice or similar gripping means. The upper handle is composed of shaft 14 having threaded lower portion 15 depending therefrom to fit into threaded opening 13 in the upper forwardly extending frame portion 11, and horizontal handle 16 at the upper end thereof. Lock nuts 17a and 17b are secured to the threaded portion of the shaft 15 and as such can be adjusted to limit the downward movement of shaft 14. The lower end of the upper handle has a camming flange 18 of greater diameter at the lower end thereof which acts on bearing pin or button 19 which is affixed to the carrier 20. The carrier 20 is slotted at 18a and engages the edge of camming flange 18 when the carrier is being raised as best seen in FIG. 4.

Backing plate or abutment plate 21 is formed integral with or welded or otherwise fixedly attached to center portion 10 of the frame. The pipe abutment plate 21 has wear plates 22 held in place by cap screws 23. These plates, which are of hardened steel, significantly minimize the wear on central portion 10 of the frame, which is made of relatively soft cast metal.

Referring particularly to FIG. 4, opening 24 extends through frame 10, removable frame plate 10a and plate 21 normal to the latter two and has bearing seats 25 and 26 circumferentially positioned around the edges thereof.

Drive shaft 27 which extends through opening 24 has square end 28 enabling shaft 27 to be driven with a power source of any conventional type, illustratively depicted in FIG. 1 as a crank handle 29. Circumferential bearing seats 30 and 31 are fixed on shaft 28 to receive ball bearings 32 in combination with opposed bearing seats 25 and 26. A female grooving roller 33 is fixed to or integral with shaft 27 and has groove or trough 34 in the face thereof with side walls 35 thereof tapered or sloped toward the center of the roller from a greater to a lesser width. The rearward portion of roller 33 is tapered inwardly at 36 forming a circumferential recess around said roller.

Referring to FIGS. 1 and 3, the center portion 10 of the frame may be seen in its upper portion to have paired shoulders 37 formed thereon. Upper roller carrier 20 has paired gripping arms 39 to fit around these shoulders and slidingly move therealong. Recess 19a (FIG. 4) is provided in the upper end of the upper roller holder or carrier 20 to receive the bearing pin or button 19. Shoulders 37 on the center portion of the frame have a sufficient gap with gripping arms 39 to allow the upper roller holder 20 to be removed from the frame for easy disassembly.

The upper male roller 40 has band 41 with sides 42 sloping from a greater width adjacent the roller surface to a lesser width away therefrom and rotatably mounted with shaft 43. The latter is received in depending portions 20a of the upper roller carrier 20 and has a knurled head 44 maintained in place in the carrier by removable pin 44a. The height of roller band 41 is preferably slightly less than the depth of groove 34 in the female roller. This relationship prevents binding of rollers 33 and 40 as the groove in the pipe is finished. The rearward or left hand portion of roller 40 as seen in the views, is flared outwardly at 45 and is offset laterally from tapered recess 36 to allow for the pipe wall. By offsetting flared end 45 relative to recess 36 and carefully considering the size and shape of the sloping sides of male roller band 42 and the grooved sides 35, the problems associated with pipe binding are significantly reduced.

In operation of the inventive grooving tool, the tool itself is firmly affixed to some solid support by means of the hexagonal shaped lower portion of the frame. A pipe end shown at 46 in FIG. 4 is inserted over the female grooving roller 33 and handle 16 is rotated moving upper grooving roller down until band 41 exerts a limited amount of pressure on the outside surface of the pipe. The pipe is then supported so that it is free to rotate. Crank handle 29 is then rotated imparting a rotary motion to shaft 27 and thusly to female grooving roller 33. This in turn rotates the pipe 46 and the male grooving roller 40. As the pipe is rotated the handle 16 is progressively tightened to bring the male roller 40 closer to the female roller 33. The constant and progressive tightening of handle 16 in conjunction with the rotation of the female grooving roller 33 exerts a component of force at grooving band 41 and the outwardly flared end 45 on the male grooving roller, which is directed inwardly on the pipe itself resulting in a prepared pipe end depicted in FIG. 5 and more completely discussed hereinafter. The constantly exerted pressure on the pipe being grooved results in a swaged outer end of the pipe due to the cooperation of the flared end 45 and the recess 36, and a sharp well-defined groove resulting from the mating of band 41 and female groove 34 in the grooving roller 33. The particular dimensions, including the angles of the side walls of outwardly tapered recessed end 45 and of its cooperating tapered recess portion 36 along with the taper of grooving band 41 and groove 34 are selected to preclude the pipe from thinning too much as it is rolled so that the pipe itself will not be weakened and pull apart due to forces within the coupling.

Figure 5:
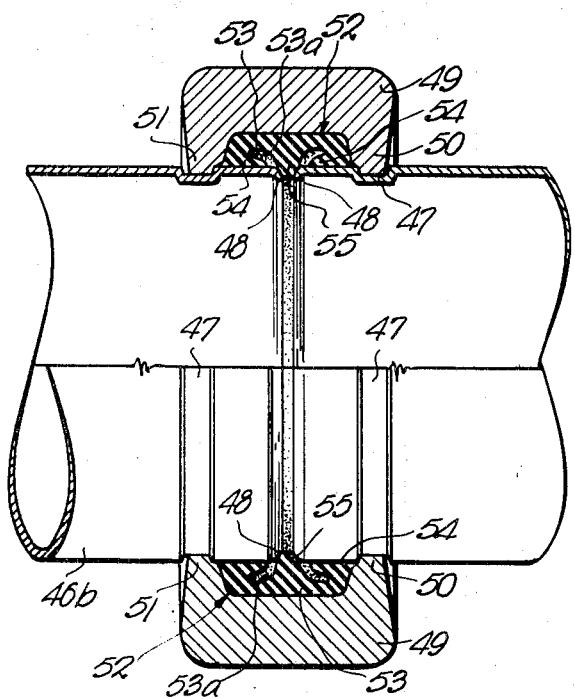
FIG. 5 is a side-sectional view of the novel coupling and gasket structure used to connect two pipe ends after they have been grooved and swaged by the grooving device of FIGS. 1–4, inclusive.

FIG. 5 depicts two pipe ends 46a and 46b which have been specially prepared by the pipe grooving device. Each pipe end is provided with a groove 47 and a swaged or tapered end 48. The two pipe ends are now ready for joining and as such are coupled with a novel pipe coupling designed to take advantage of the special pipe end preparation.

The patents to Damsel 2,362,452 issued Nov. 14, 1944 and Stephens 2,005,056 issued June 18, 1935 show the basic construction of a pipe coupling comprising a pair of identical housings and a pressure responsive gasket located therein. The housings are further equipped with bolt pads at their ends to receive connecting bolts which, when properly used, results in a secure connection.

The coupling of my invention includes housings 49, shown in cross section in FIG. 3. It should be noted that my housing is similar in its shape and connectability to that shown in the above-mentioned Stephens patent and will be securely fastened to the pipe ends 46a and 46b by a similar set of bolts (not shown). Housing 49 has a pair of radial shoulders 50 and 51 so dimensioned as to fit in the grooves 47 of pipe ends 46a and 46b, respectively. Housing 49, along with the accompanying shoulders 50 and 51 form a gasket receiving channel 52 into which pressure responsive gasket 53 will snugly fit. Gasket 53 includes a pair of flexible lips 54 which fit flush against smooth cylinder surfaces of the pipe ends from the grooves 47 to the swaged ends 48. In addition to the lips 54, gasket 53 has a tongue 55 which is in pressure contact with the swaged ends 48 due to the usual radial forces exerted when the coupling unit is securely affixed to both pipe ends.

In applying the inventive pipe coupling to pipe ends 46a and 46b, the gasket is slipped over the pipe ends and brought into position with the sealing lips and extending tongue properly oriented with respect to the grooves and the swaged pipe ends. The twin housing halves are then positioned over the gasket and the bolts and nuts inserted and properly and equally tightened with a conventional wrench. With shoulders 50 and 51 of housing 49 rigidly engaging the grooves 47, the housing is firmly in place at the proper required location. The sealing lips 54 bear against the outside of the pipe ends and prevent any leakage of the fluid carried by the pipe. In addition, tongue 55 which is in pressure contact with the tapered ends 48, substantially protects the rolled pipe ends from corrosion which may result due to the presence of the fluid inside the pipe. The tongue 55 actually seals the entire coupling, including the vacuum cavity 53a. Thus my improved pipe coupling provides the additional advantage of corrosion protection along with a pressure responsive gripping resulting from the hollow gasket and the tightening of lips 54 against surface exterior portions of pipe ends 46a and 46b.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A pipe grooving tool comprising:
   a frame,
   a pipe abutment plate fixed to said frame,
   a cylindrical female grooving roller rotatably mounted on said frame with one end thereof engaging said pipe abutment plate,
   said female grooving roller having an indented groove intermediate the ends thereof and said one end thereof engaging said pipe abutment plate having a circumferentially inwardly beveled portion, drive means operable to rotate said female grooving roller, a cylindrical male grooving roller laterally aligned with said female grooving roller and having a circumferentially raised grooving band intermediate the ends thereof and a circumferentially outwardly flared portion aligned with said inwardly beveled portion of said female grooving roller, said outwardly flared portion of said male grooving roller operable to wedge the end of a pipe abutting said pipe abutment plate into said inwardly beveled portion of said female grooving roller, and carrier means mounted on said frame to rotatably support said male grooving roller and to move said male grooving roller toward or away from said female grooving roller as said drive means rotates said female grooving roller.

2. A pipe grooving tool as in claim 1, wherein the height of said raised grooving band on said male grooving roller is less than the depth of said indented groove of said female grooving roller.

3. The pipe grooving tool as in claim 1, wherein the sides of said raised grooving band of said male grooving roller are inwardly tapered therefrom and the sides of said intended groove of said female grooving roller are tapered outwardly therefrom.

4. The pipe grooving tool as in claim 1, wherein the width of said raised grooving band of said male grooving roller is less than the width of said indented groove of said female grooving roller.

5. The pipe grooving tool as in claim 1, wherein the height of said outwardly flared portion of said male grooving roller is less than the depth of said inwardly beveled portion of said female grooving roller and the width of said outwardly flared portion is less than the width of said inwardly beveled portion.

References Cited

UNITED STATES PATENTS

| | | | |
|---|---|---|---|
| 3,015,502 | 1/1962 | Frost et al. | 72—101 |
| 79,735 | 7/1868 | DeWitt | 72—105 |

LOWELL A. LARSON, Primary Examiner

U.S. Cl. X.R.

72—101